Feb. 9, 1943.     H. G. ALLEN     2,310,382
METHOD AND MEANS FOR SEALING CONTAINERS
Filed Feb. 2, 1940     5 Sheets-Sheet 1

Fig. 1.

INVENTOR
Howard G. Allen
BY
ATTORNEY

Feb. 9, 1943. H. G. ALLEN 2,310,382
METHOD AND MEANS FOR SEALING CONTAINERS
Filed Feb. 2, 1940 5 Sheets-Sheet 2

INVENTOR
Howard G. Allen
BY
ATTORNEY

Feb. 9, 1943.   H. G. ALLEN   2,310,382
METHOD AND MEANS FOR SEALING CONTAINERS
Filed Feb. 2, 1940   5 Sheets-Sheet 3

INVENTOR
Howard G. Allen
BY
ATTORNEY

Feb. 9, 1943.  H. G. ALLEN  2,310,382
METHOD AND MEANS FOR SEALING CONTAINERS
Filed Feb. 2, 1940  5 Sheets-Sheet 4

INVENTOR
Howard G. Allen
BY
ATTORNEY

Feb. 9, 1943.                H. G. ALLEN                2,310,382
               METHOD AND MEANS FOR SEALING CONTAINERS
                   Filed Feb. 2, 1940         5 Sheets-Sheet 5

INVENTOR
Howard G. Allen
BY
ATTORNEY

Patented Feb. 9, 1943

2,310,382

UNITED STATES PATENT OFFICE 2,310,382

METHOD AND MEANS FOR SEALING CONTAINERS

Howard G. Allen, Niagara Falls, N. Y., assignor to Consolidated Packaging Machinery Corporation, Buffalo, N. Y., a corporation of New York Application February 2, 1940, Serial No. 316,938

28 Claims. (Cl. 93—6)

The present invention relates to a machine and method for closing filled flexible containers such as bags. More particularly, the machine and method herein disclosed are adapted to effectively seal a filled bag to prevent the egress of material which may be contained therein and/or to prevent the ingress of air, moisture or the like to the contents of the bag. This invention is of particular utility in the use of paper bags for the packaging of relatively small quantities, say from a few ounces up to as much as twenty-five pounds, of material intended for the retail trade. Certain materials as, for example, coffee, tea, flour, or sugar, may be so finely divided as to tend to escape from the bag. In addition, these materials may be hygroscopic, aromatic or deliquescent or otherwise so constituted as to tend to lose certain of their desirable characteristics when exposed to the air or to moisture or to contaminating conditions which may exist externally of the bag. In the packaging of materials of this general classification it is extremely desirable that the container be tightly sealed.

It is an object of the present invention to provide a method of closing a flexible container whereby the container will be effectively sealed in closed condition.

It is a further object of the present invention to provide a machine which is capable of closing and effectively sealing a filled flexible container.

It is further an object of the present invention to provide a mechanism which may be conveniently added to the bag closing machine disclosed in United States Patent No. 2,175,557 granted October 10, 1939, to Luta L. Cundall, administratrix of Robert N. Cundall, to effectively seal a filled flexible container closed upon the machine of said patent.

It is a further object of the present invention to provide a simple and effective mechanism for the insertion of adhesive into the open edges of a bag mouth whereby to effectively seal said edges against the egress of material therefrom and the ingress of the atmosphere.

It is a further object of the present invention to provide a method of closing a filled flexible container such as a paper bag which comprises the insertion of adhesive into the open edges of the bag mouth.

It is a further object of the present invention to provide a method and machine for the closing of filled bags which include the operations of trimming the open edges of the bag mouth and applying adhesive to the inner peripheral surface adjacent the edges of the bag mouth whereby opposed portions of such peripheral surface may be adhered together.

It is a further object of the present invention to provide a method and machine for the closing of filled bags which include the operations of collapsing the bag mouth, trimming the open edges of the bag mouth and inserting adhesive into the trimmed edges of said bag mouth.

It is a further object of the present invention to provide a method and a machine for closing filled bags which include the operations of collapsing the upwardly extending unfilled mouth portions of such a bag, inserting adhesive into the open edges of such collapsed mouth and securing the collapsed mouth to the filled body of the bag.

Other and further advantages and objects of the present invention will become apparent from a consideration of the following description of preferred embodiments of the invention.

Referring now to the drawings.

Figure 1:
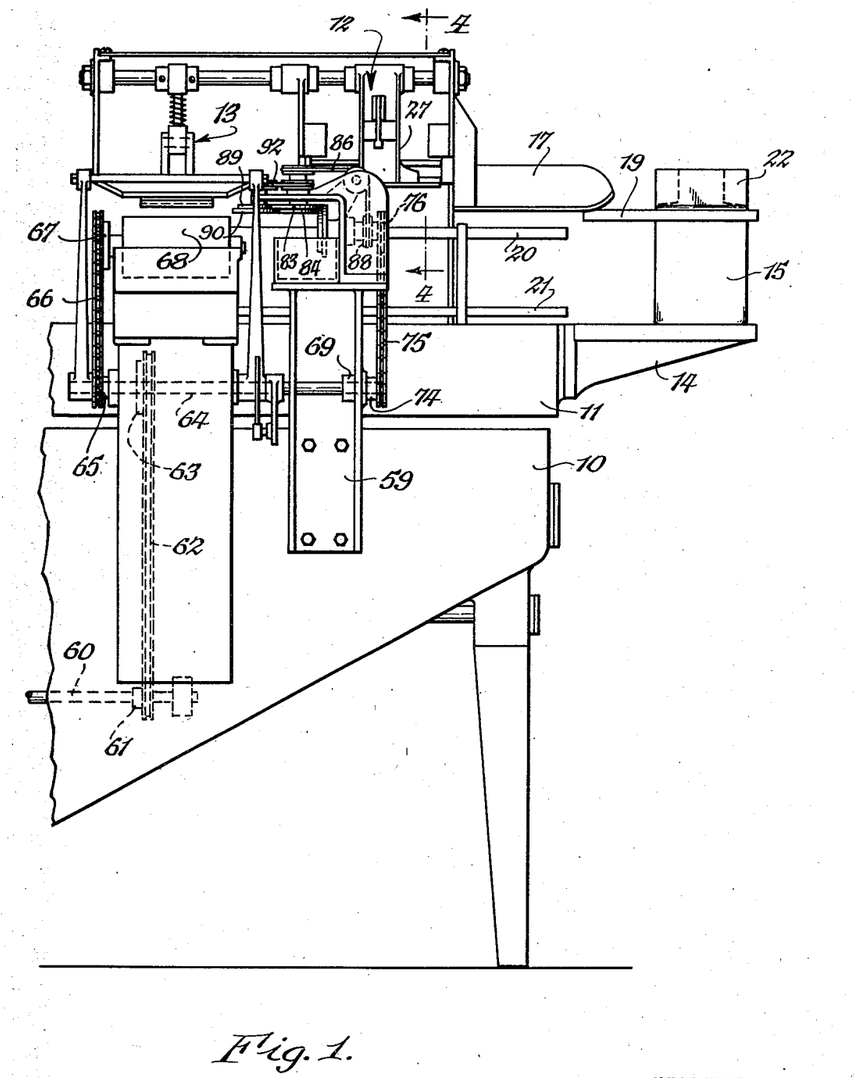
Fig. 1 is an elevation of a portion of a machine to which the present invention may be applied.
Figure 2:
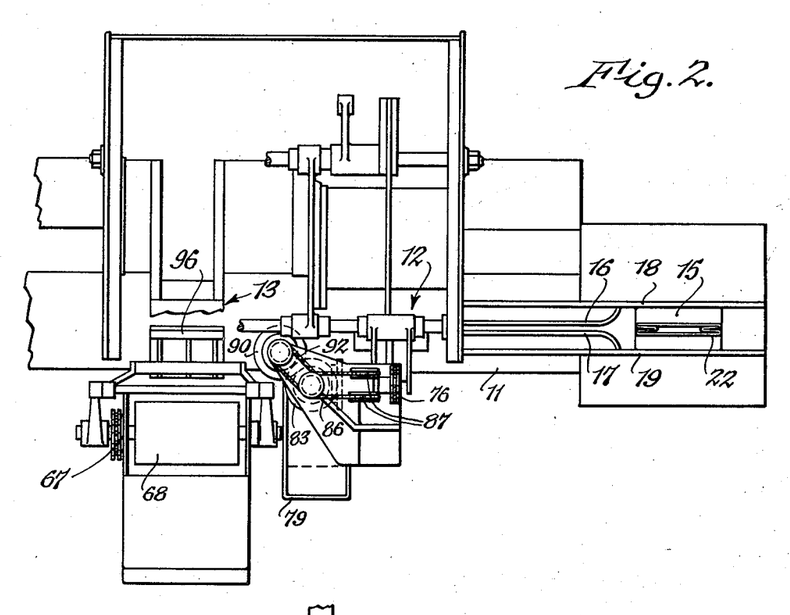
Fig. 2 is a plan view of the same.

Referring now to Figs. 1 and 2, there is shown the essential operating portion of a bag closing machine which is fully disclosed and claimed in U. S. Patent 2,175,557 aforesaid. Reference is here made to said patent for a detailed disclosure of such machine. Only sufficient description will be herein set forth to provide a full understanding of the method and mechanism for sealing the mouth of the bag which is otherwise operated upon by the machine in the manner described in said patent. In these figures as well as in Figures 3, 7 and 8 there is shown mechanism which may be added to the machine of said patent to adapt said machine for the formation of the sealed closure herein contemplated. It is to be understood that this mechanism represents merely a preferred embodiment of mechanism for accomplishing the object of this invention and that the detailed description herein-after given and the specific relationship of this mechanism with the particular closing machine chosen for illustration from U. S. Patent 2,175,557 is not to be taken in a limiting sense. Equivalent mechanisms may be embodied in the present machine and the present mechanism or its equivalent may be embodied in closing machines of various types.

As shown in Fig. 1 the machine to which my invention may be applied comprises a base 10 upon which is supported a conveyor table 11 which may be adjusted vertically for the purpose of accommodating bags of various sizes. The base 10 also supports the closure forming stations which comprise a creasing, trimming and preliminary folding station indicated generally at 12 and an adhesive applying and final folding station indicated generally at 13. These stations are driven from a suitable source of power (not shown) in a manner fully shown and described in Patent No. 2,175,557.

The conveyor table 11 supports an extension 14 upon which a filled bag 15 may be positioned preparatory to passage through the machine. As shown in Figs. 1 and 2 the bag 15 has been filled to predetermined level. The filling of the bag 15 may be performed manually or on any suitable automatic or semi-automatic filling device. For the purposes of the present invention, considered from the standpoint of a method, the filling of the bag is to be considered as a specific step in the method. To this end the bag 15 may be filled by any suitable method or means in the position shown upon the extension 14.

After the bag 15 has been filled the upwardly extending unfilled mouth portion may be collapsed either manually or by suitable machinery disclosed, for example, in U. S. Patent No. 2,094,061 granted September 28, 1937, to Robert N. Cundall. For the purposes of the particular machine herein chosen for illustration, the side walls of the unfilled, upwardly extending mouth portion are tucked inwardly and the front and rear walls are collapsed upon the inwardly tucked side walls to form a collapsed bellows-folded mouth portion which lies substantially in a plane disposed generally vertically with respect to the plane of the top of the contents of the bag. This collapsed mouth is open at its upper edges as illustrated in exaggerated form in Fig. 2.

From its position upon the extension 14 the bag may be moved to the left as viewed in Figs. 1 and 2 and the collapsed mouth portion thereof may be guided into the throat formed between a pair of suitable guide rails 16 and 17. Additional guide rails 18 and 19 may be provided for assisting in guiding of the upper filled portion of the bag 15 and further guide rails, such as 20, 21, may be provided in front of and in rear of the body of the bag to assist in maintaining the bag in proper alignment in its passage through the machine. Any suitable form of intermittently operable conveyor may be availed of to propel the bag through the machine and to provide for suitable periods of rest whereby the bag may remain stationary for a sufficient time to permit operation of the various closing stations. The conveyor has not been illustrated and reference is here made to Patent No. 2,175,557 for disclosure of suitable mechanism which it is contemplated to use in the present structure. The conveying mechanism thus supplied serves to move the bag 15 into suitable operative position relative to the first station 12.

Figure 4:
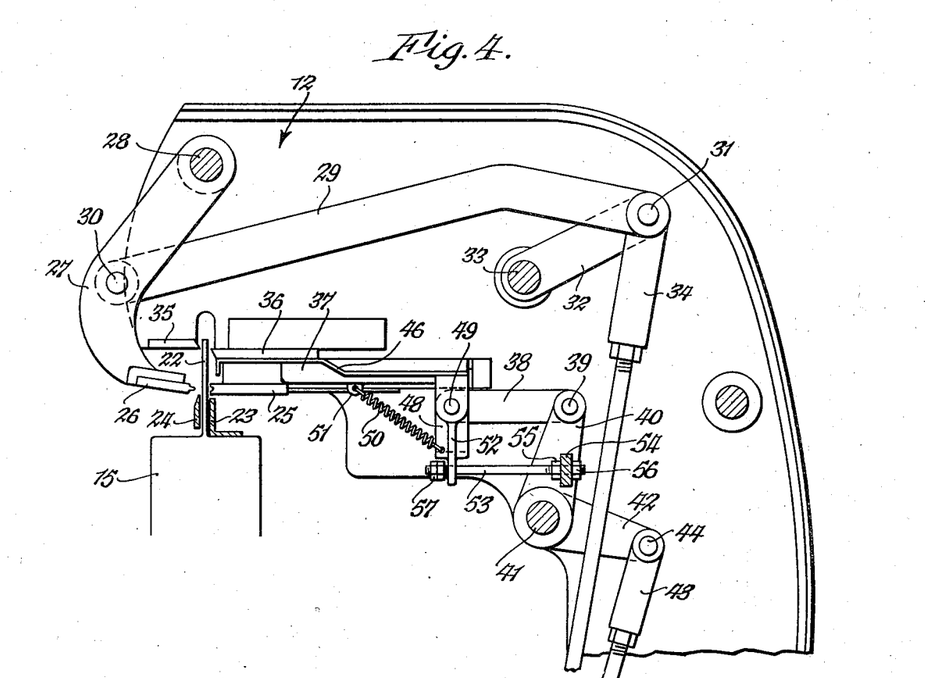
Fig. 4 is a section on the line of 4—4 of Fig. 1 illustrating a trimming, creasing and folding station of the type disclosed in Patent No. 2,175,557.

Referring now to Fig. 4 the mechanism forming the station 12 is illustrated in sufficient detail to provide a complete understanding of the present invention. The bag 15 is progressed into this station with the collapsed mouth portion 22 thereof guided between suitable guide elements 23 and 24. A female creasing die 25 is mounted at predetermined distance above the level of the contents of the bag 15 and a male creasing die 26 is carried by a lever 27 pivoted on a cross rod 28 supported by the frame work of the machine. A link 29 is pivoted at 30 to the lever 27 and is pivoted at 31 upon a rock arm 32 pivotally carried by a cross shaft 33 supported in the frame work of the machine. A cam actuated rod 34 is also pivoted at 31 to the rock arm 32. By the operation of a suitably timed cam (not shown) the rod 34 is caused to move in a generally vertical direction whereby to draw the link 29 to the right as viewed in Fig. 4 to bring the male creasing die 26 into engagement with the bag mouth 22 and with the female die 25. These dies thus serve to form a crease transversely of the collapsed bag mouth.

Figure 5:
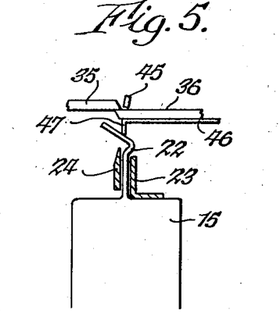
Figs. 5 and 6 are diagrammatic views illustrating the operation of the station shown in Fig. 4.

A stationary blade 35 carried by the frame work of the machine is located at a distance above the plane of operation of the creasing dies 25, 26 substantially equal to the distance from the level of the contents of the bag 15 to the plane of said creasing dies. A movable blade 36 is carried by a slide 37 which has pivotally connected to its rear end a link 38 which is in turn pivoted at 39 to an arm 40. The arm 40 is pivoted upon a rock shaft 41 and an arm 42 is fixed to the arm 40 for rotation therewith whereby the arms 40 and 42 form a bell crank lever. A cam actuated rod 43 is pivoted as at 44 to the arm 42 of the bell crank. Suitable cam mechanism (not shown) is provided for moving the rod 43 in a generally vertical direction whereby, through the action of the bell crank 42, 40 and link 38, the slide 37 may be reciprocated in timed relation with the operation of the creasing dies 25, 26. Preferably, the slide 37 is moved forward substantially concurrently with the action of the dies 25, 26. This movement of the slide 37 serves to bring the blade 36 into shearing relationship with the blade 35 whereby to trim any portion of the collapsed bag mouth which may lie above the plane of operation of the blades 35, 36. As shown in Fig. 5, the blades 35 and 36 have been caused to trim a portion 45 from the collapsed mouth 22 of the bag 15.

The trimming operation just described is provided in the machine disclosed in Patent No. 2,175,557 and is availed of therein to insure the formation of uniform closures upon bags of a given size which may have been filled with varying volumes of material. In connection with the present invention the trimming operation is of additional value. Paper bags of the type used in the packaging of coffee, sugar and other related commodities are almost invariably formed with a thumb notch in the open edges thereof. This thumb notch is not only provided for convenience in opening the bag mouth but it is also essential in the formation of certain forms of bottom closures. In the present invention it is contemplated to trim all or substantially all of the portion of the bag in which the thumb notch is formed whereby the mouth of the bag will be uniform throughout. These uniform edges may be brought together and sealed in accordance with the present invention as will be more fully understood as the disclosure proceeds.

Figure 6:
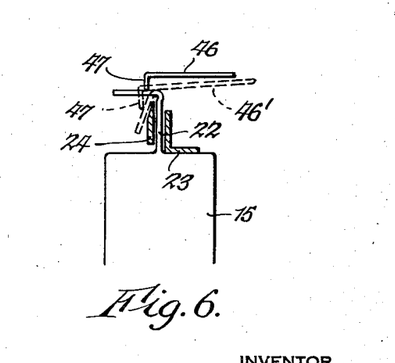

The slide 37 also carries a folding blade 46 having a downward extension 47 located somewhat behind the shearing edge of the blade 36. As illustrated in Fig. 5, the extension 47 engages the portion of the bag mouth 22 extending above the crease formed by dies 25, 26 and serves to initiate folding of the bag mouth along this crease line. The folding blade 46 has at its rear end a downwardly extending portion 48 which is pivoted to the slide 37 upon a suitable stud 49 which may also serve as the pivotal connection for the link 39 heretofore described. A contractile spring 50 is stretched between the extension 48 and a suitable anchor 51 formed upon the slide 37 and tends to rotate the blade in a clockwise direction into the position illustrated in Figs. 4 and 5. The extension 48 has suitably secured thereto an ear 52 which is perforated to slidably receive a bolt 53 secured to a suitable support 54 forming a part of the machine frame. As shown in Fig. 4, the bolt 53 may be secured at one end to the support 54 by the use of lock nuts 55, 56. At the opposite end and beyond the ear 52 the bolt 53 carries a pair of adjustable lock nuts 57 which serve as an abutment against which the ear 52 engages during course of the forward movement of the slide 37. When such engagement occurs, the folding blade 46 will be rocked against the tension of spring 50 in a counterclockwise direction. As shown in full lines in Fig. 6 the folding blade 46 is in a position just prior to engagement between the ear 52 and the abutment 57. Further forward movement of the slide 37 will result in movement of the folding blade 46 into the position illustrated in dotted lines and identified by the reference numeral 46'. The action of the folding blade 46 just described serves to fold the collapsed bag mouth into the position illustrated in dotted lines in Fig. 6.

In the operation of the machine disclosed in Patent No. 2,175,557 the bag 15 having its collapsed mouth folded as just described is engaged by the conveying mechanism for movement to a final folding station. According to the present invention there is provided a station intermediate the stations disclosed in said patent. This additional station serves to insert adhesive into the open edges of the bag mouth in such manner that the inner peripheral surfaces adjacent said edges may be adhered together throughout their extent whereby the mouth is effectively sealed. The embodiment herein chosen for illustration includes an adhesive carrying member which is so positioned that the open edges of the bag mouth are engaged therewith to secure the insertion of an adequate quantity of adhesive into the open edges. Pressure thereafter applied in any suitable manner will serve to press opposed portions of the inner periphery of the open edges into engagement with each other and with the adhesive inserted therebetween. The open edges of the collapsed bag mouth will therefore be sealed by a continuous line of adhesive extending throughout the periphery thereof.

The guides 23 and 24 (Figs. 4, 5 and 6) are preferably extended beyond the station 12 into suitable proximity to the station 13. The guide 24 together with an additional guide 58, which may conveniently comprise an elongated cylindrical rod, are so disposed as to maintain the collapsed mouth 22 in its folded position while the bag 15 is moved from the station 12 to station 13.

According to the present invention an adhesive inserting station is so disposed intermediate the stations 12 and 13 that the guides 58 and 24 will serve to guide the open edges of the bag mouth into contact with an adhesive carrying member while the bag is being transferred from station 12 to station 13.

Referring back to Fig. 1, the adhesive inserting station is supported upon a suitable bracket 59 secured to the base 10 of the machine. The movable portions of this station are driven from a suitable source of power available in the machine disclosed in Patent No. 2,175,557. For the purposes of illustration this station may be driven by the means which are normally provided for driving the adhesive applying portion of the station 13. As shown in Fig. 1 this driving means may comprise a constantly rotating shaft 60 connected to the sources of power and having a sprocket 61 thereon. The sprocket 61 through a sprocket chain 62 imparts rotation to a sprocket 63 and shaft 64 suitably supported in the machine frame. The shaft 64 is operative through a sprocket 65, sprocket chain 66 and sprocket 67 to rotate an adhesive carrying roll 68 which forms a part of the final station 13 as described in Patent No. 2,175,557. For the purposes of the present invention the shaft 64 is preferably extended to the right as viewed in Fig. 1 into a bearing 69 carried by the bracket 59. At its outer end the shaft 64 carries a sprocket 74 which through a chain 75 and a sprocket wheel 76 imparts rotation to a stub shaft 77 (see Fig. 3) mounted for rotation in the adhesive inserting unit.

The adhesive inserting unit may conveniently comprise a supporting frame 78 and an adhesive reservoir 79 suitably secured to the bracket 59. Reservoir 79 may be filled to a suitable level with any desired form of adhesive 80. The stub shaft 77 has secured thereto for rotation therewith a pair of adhesive carrying discs which are of suitable diameter to dip into the adhesive 80. One of these discs 81 is larger in diameter than its companion disc 82 and it will be observed that adhesive will be carried by the peripheral surfaces and portions of the radial surfaces of each of the discs 81 and 82. The frame 78 is formed with a horizontally extending portion overhanging the adhesive reservoir 79 and having a suitable bearing formed therein for rotatably mounting a pair of adhesive transfer discs 83 and 84 which are arranged for contact respectively with the discs 81 and 82. The pair of discs 83 and 84 are carried on the lower end of a stub shaft, not shown, which extends upwardly beyond the frame 87 and has secured thereto a pulley 85. A suitable driving belt 86 passes around the pulley 85 and over a pair of idlers 87 into driving relation with a pulley 88 mounted for rotation with the stub shaft 77. This mechanism provides for rotation of the discs 83 and 84 at a suitable speed which may preferably be substantially equal to the speed of rotation of the discs 81 and 82.

The frame 78 also rotatably supports another pair of adhesive transfer discs 89 and 90 which are positioned for contact respectively with the discs 83 and 84. The discs 89 and 90 may be carried on the lower end of a stub shaft, not shown, at whose upper end is mounted a pulley 91. A suitable belt 92 passes around the pulley 91 and into driving engagement with a pulley 93 secured for rotation with the pulley 85 associated with the discs 83 and 84. The mechanism thus described provides for positive rotation of the discs 89 and 90 at a suitable speed which may preferably be substantially equal to the speed of rotation of the discs 83 and 84.

Figure 3:
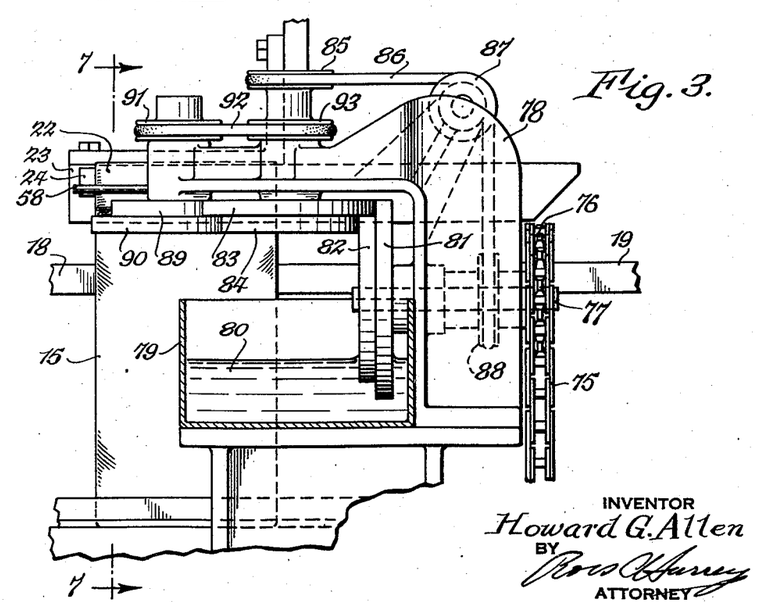
Fig. 3 is a detailed elevation of the embodiment of the invention shown in Fig. 1.

From an observation of Fig. 3 it will be apparent that adhesive carried by the radial and peripheral portions of the discs 81 and 82 will be transferred to the peripheral surfaces of the discs 83 and 84 and to that portion of the radial surface of disc 83 which lies between the peripheral surfaces of the discs 83 and 84. The adhesive thus carried by the discs 83 and 84 will be transferred to the peripheral surfaces of the discs 89 and 90 and to that portion of the radial surface of the disc 90 which lies between the peripheral surfaces of the discs 89 and 90.

Figure 7:
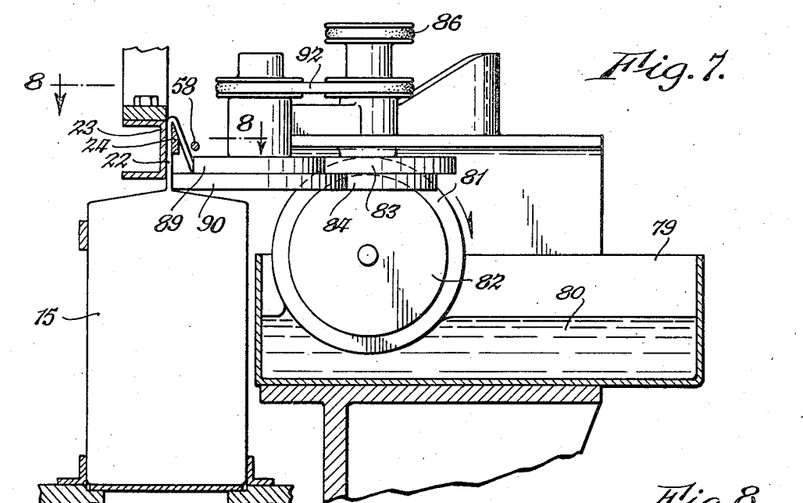
Fig. 7 is a section along the line 7—7 in Fig. 3.
Figures 8, 9, 10, 11, 12:
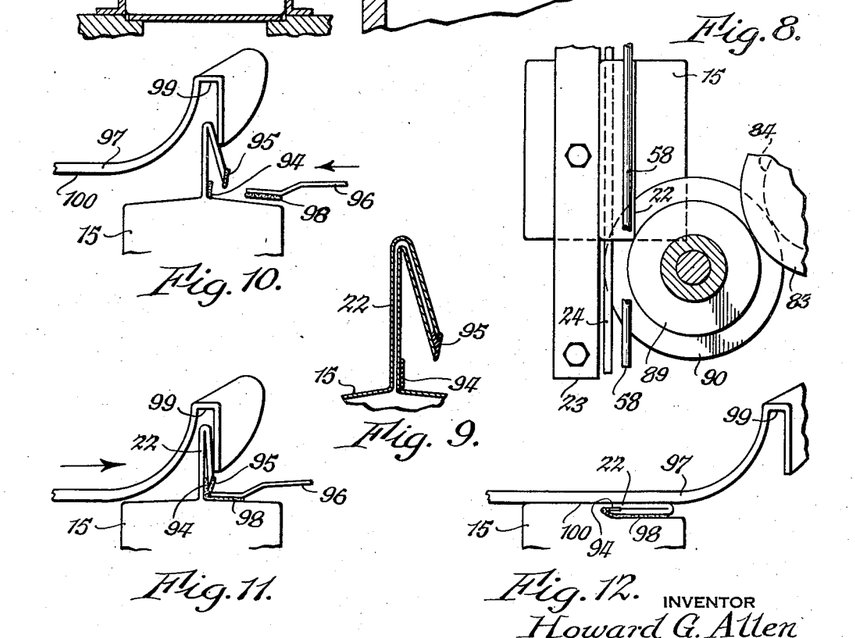
Fig. 8 is a section along the line 8—8 in Fig. 7.
Fig. 9 is a sectional view of a bag to which adhesive has been applied by the embodiment of my invention shown in Figs. 1, 2, 3 and 7.
Figs. 10, 11 and 12 are diagrammatic illustrations of the method and mechanism for forming a closure.

Referring now to Figs. 7 and 8 it will be observed that the discs 89 and 90 are so positioned as to extend into the path of the bag 15 as the same progresses between stations 12 and 13. The peripheral surface of the disc 90 is extended into such position as to engage and transfer adhesive to the vertically extending portion of the collapsed mouth 22 of the bag. Preferably the adhesive thus applied to the bag mouth is applied adjacent the base of the mouth and extends substantially into the apex of the angle between the bag mouth and the plane of the top of the bag contents. In Fig. 9 the adhesive thus applied is indicated by the reference numeral 94.

The peripheral surface of the disc 89 is so positioned as to engage and transfer adhesive to the open edges of the down turned flap of the bag mouth 22 as the same moves between guides 24 and 58. The adhesive carried by the peripheral surface of the disc 89 and the adhesive carried by the radial portion of the disc 90 adjacent thereto is all available for contact with the edges of the bag mouth. Thus minor variations in the length of the down turned flap and minor variations in the actual position of the open edges will not result in failure to insert adhesive into the open edges. In certain cases one of the edges will engage the disc 89 while the other edge may engage the disc 90. In other cases both of the edges may engage either one of the discs. As above described driving mechanism is provided for positive rotation of the various adhesive carrying discs for the purpose of transferring adhesive to the discs 89 and 90. The relative directions of rotation of these discs is immaterial. The speed of rotation is a matter of choice, it being preferred to rotate the discs 89 and 90 at such a speed as to transfer an adequate quantity of adhesive to the portions of the bag with which these discs engage. To this end the speed may be so chosen as to provide a substantial relative movement between the edges of the bag mouth and the disc surfaces. Thus the adhesive will be projected into the space between opposed portions of the inner peripheral surface of the bag mouth adjacent these open edges. Naturally the quantity of adhesive thus inserted may be controlled by proper selection of speed of rotation of the discs 89 and 90.

The adhesive applied to and inserted between the open edges of the bag mouth 22 is indicated in Fig. 9 by the reference numeral 95. In said Fig. 9 a normal positioning of the bag mouth is illustrated. As described above in connection with the mechanism shown in Fig. 4 the bag mouth 22 is trimmed while it occupies a substantially vertical position. Accordingly, the opposite edges of the open mouth will be substantially horizontally aligned after trimming. It will be readily understood that the folding of the bag mouth thereafter will tend to offset these edges, the edge of the rear wall being shortened somewhat because this wall follows a longer path through the transverse fold. This offsetting of the edges is clearly shown in Fig. 9. It is to be understood, however, that my invention is not limited to successful operation under these particular conditions. As explained above the open edges, regardless of their relative disposition, will engage one or the other of the adhesive carrying discs 89 and 90. The space between the open edges of the bag mouth will naturally be quite small and the insertion of adhesive therein may be considered to be roughly analogous to a capillary action. From an inspection of Fig. 8 it will be seen that the disc 89 is so positioned that as the flap 22 engages and passes the highest point of the periphery thereof it will be bent backwardly somewhat. This backward movement will tend to drag the open edges across the radial surface of the disc 90 thus providing additional opportunity for the insertion of adhesive into the open edges.

The bag 15, having adhesive 94 and 95 supplied as illustrated in Fig. 9, may now be progressed by the conveying mechanism of the machine into suitable position for operation of the final closing station 13. This final closing station has not been illustrated in great detail and reference is again made to Patent No. 2,175,557 for additional disclosure. As shown in Fig. 10 the final closing station 13 comprises an adhesive applying blade 96 and a final folding member 97. The adhesive blade 96 is moved in proper timed relation into contact with the adhesive supply roll 68 and from this roll into contact with the horizontal shoulder portion of a filled bag. In Fig. 10 adhesive 98 is shown on the blade 96. The final folding member 97 is formed with an inverted generally U-shaped channel 99 into which the folded bag mouth is guided by the action of guides 24 and 58 or other equivalent guiding structures. The adhesive blade 96 is moved to the left as viewed in Fig. 10 to a position wherein the extremity thereof lies substantially within the apex of the angle between the vertical portion of the collapsed mouth and the plane of the contents of the bag. This latter position is illustrated in Fig. 11. The final folding member 97 is mounted upon a suitably movable slide (not shown) for movement to the right as viewed in Fig. 10 and a concurrent downward motion to bring the horizontal undersurface 100 thereof into contact with the top of the bag. Continued movement to the right will bend the folded bag mouth along the extremity of the adhesive blade 96 which is thereafter moved to the right to withdraw the extremity thereof and to spread adhesive over the horizontal shoulder portion of the bag. Continued movement of the folding member 97 will press the folded bag mouth downwardly into contact with the adhesive 98 applied by the blade 96 for the purpose of securing the folded mouth to the shoulder of the bag. The final operated position of the folding member 97 is illustrated in Fig. 12.

From an observation of Figs. 10, 11 and 12 it will be seen that the adhesive 94 on the vertical portion of the bag mouth, the adhesive 95 at the edges of the bag mouth and the adhesive 98 on the shoulder of the bag will be brought into mutual engagement whereby the edges of the bag mouth are securely sealed and held in finally folded position by a continuous body of adhesive.

Figure 13:
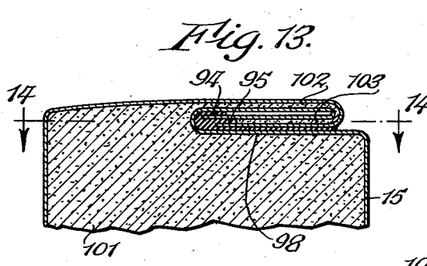
Fig. 13 is a sectional view of a filled and sealed bag which has been closed by the method and machine illustrated in Figs. 1 to 12 inclusive.
Figure 14:
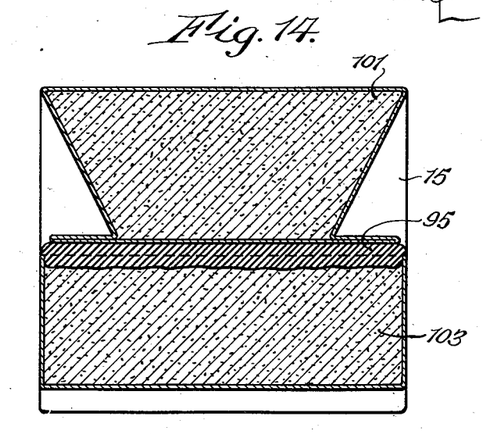
Fig. 14 is a section along the line 14—14 of Fig. 13.

Referring now to Figs. 13 and 14, a bag 15 is shown as filled with a commodity 101 which for the purposes of illustration may be considered as a finely divided material such as flour. The showing in Figs. 13 and 14 is intended to illustrate the condition of a filled bag which has been closed and sealed according to the method and upon the machine hereinabove described after the filled bag has been subjected to handling as, for example, the handling incident to packing and shipping the bag and unpacking and positioning the same upon a retailer's shelf. During the course of such handling the material 101 within the bag will tend to work itself through the passageway extending through the folded mouth. Thus in Fig. 13 the material is indicated at 102 and 103 in the reversely disposed portions of the passageway within the collapsed and folded mouth. It will be apparent from this figure that the material thus tends to progress toward the edges of the bag mouth. The effect of the present invention is to form a sealing plug entirely across the edges of the bag mouth whereby to prevent escape of the contents of the bag. In Fig. 13 it will be observed that the adhesive 95 forms an effective barrier within the passageway through which the material might otherwise tend to escape. It will also be observed that the adhesive 95 has merged with the adhesive 94 and the adhesive 98 to form an integral mass. In Fig. 14 the sectional plane has been so chosen as to show that the adhesive barrier 95 extends throughout the width of the open edges of the bag mouth whereby to prevent the escape of the material in the position illustrated at 103.

Figures 15, 17:
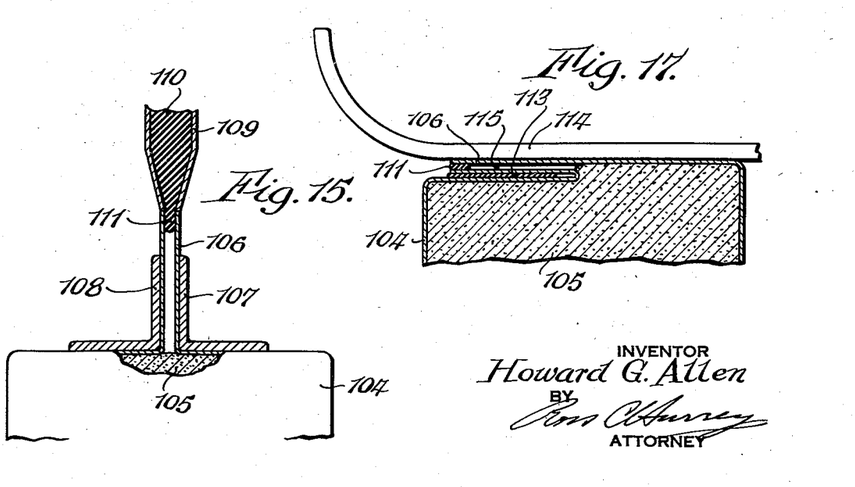
Figs. 15, 16 and 17 illustrate a modified method and means for sealing a filled bag.
Figure 16:
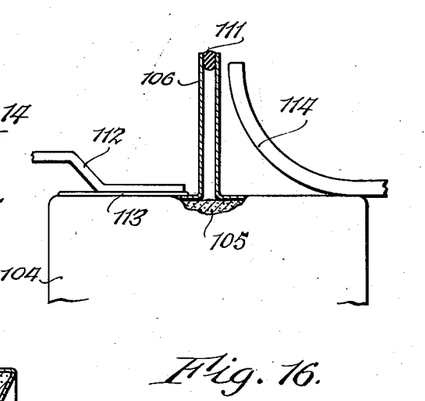

In Figs. 15, 16 and 17 there is shown a modified method of sealing a filled bag together with a modified mechanism for carrying out this method. In Fig. 15 a bag 104 is shown filled to suitable level with a material indicated at 105. The mouth portion of the bag 104 has been collapsed and is indicated at 106. The collapsed bag mouth may be conducted between suitable guides 107 and 108 which serve to hold the bag mouth in a general vertical condition and to hold the open edges thereof in proximity with one another. An adhesive nozzle 109 of any suitable form having a quantity of adhesive 110 therein is provided. The nozzle 109 is brought into engagement with the open edges of the mouth 106 and suitable pressure is applied to the adhesive 110 to propel adhesive from the nozzle into the collapsed mouth 106. The nozzle may be progressively moved across the width of the bag mouth while adhesive is propelled therefrom whereby to position a suitable quantity of adhesive 111 within the bag mouth throughout its width. The nozzle 109 could be of a width commensurate with the width of the bag mouth whereby to deposit adhesive throughout the width of the bag mouth at a single operation.

Any suitable means may be availed of to press the opposed portions of the collapsed mouth 106 into adhering relationship with the adhesive 111 positioned therein and any suitable disposition of the thus sealed bag mouth may be made. For the purposes of illustration I have shown in Figs. 16 and 17 a mechanism for applying adhesive to a portion of the bag adjacent the collapsed and sealed mouth 106 and a device for folding the mouth 106 into contact with the adhesive bearing portion of the bag. To this end an adhesive applying blade 112 may be moved into contact with a shoulder of the bag 104 to apply thereto a layer of adhesive 113. A folding member 114 may be moved by any suitable means to the left as viewed in Fig. 16 to fold the collapsed mouth 106 in a counterclockwise direction into contact with the adhesive 113. Any suitable or desirable amount of pressure may be applied by downward movement of the folding member 114 to insure adherence of the mouth to the adhesive 113 and to insure adherence of the open edges to one another through the medium of the adhesive 111 therebetween.

In Fig. 17 I have illustrated the final position of the folding member 114 and the completed closure. As shown in said figure, the adhesive 111 serves as a barrier to the passageway 115 extending between the collapsed walls of the bag mouth. Subsequent handling of the bag may result in the movement of portions of the material 105 into the passageway 115 but such material will be effectively prevented from escaping by the action of adhesive 111.

It will be understood that in each of the modifications of my invention hereinabove described the specific manner of securing the sealed bag mouth to the bag body may be varied at will. Thus for example the sealed bag mouth may be secured by means of an adhesive tape applied in any well known manner or by staples, rivets or the like.

For the purposes of compliance with the patent statutes the above detailed description of preferred methods and machinery for practicing my invention have been set forth. It will be obvious to those skilled in the art that modifications and variations may be resorted to within the scope of the appended claims.

I claim:

1. The method of closing a filled bag comprising tucking the side walls of the unfilled mouth portion of a bag inwardly between the front and rear walls of said mouth portion, collapsing said front and rear walls upon said inwardly tucked side walls, and inserting adhesive between the opposed inner edges of said collapsed bag mouth to seal said mouth in closed position.

2. The method of closing a filled bag comprising tucking the side walls of the unfilled mouth portion of a filled bag inwardly between the front and rear walls of said mouth portion, collapsing said front and rear walls upon said inwardly tucked side walls, inserting adhesive between opposed inner edges of said collapsed bag mouth to seal said mouth in closed position, folding said collapsed mouth against the filled portion of said bag, and securing said mouth is folded position.

3. The method of closing a filled bag comparting tucking the side walls of the unfilled mouth portion of a bag inwardly between the front and rear walls of said mouth portion, collapsing said front and rear walls upon said inwardly tucked side walls, inserting adhesive between the opposed inner edges of said collapsed bag mouth to seal said mouth in closed position, applying adhesive to a portion of said bag adjacent said collapsed mouth, and folding said collapsed mouth into contact with said last named portion of said bag.

4. The method of closing a filled bag comprising tacking the side walls of the unfilled mouth portion of a bag inwardly between the front and rear walls of said mouth portion, collapsing said front and rear walls upon said inwardly tucked side walls, folding said collapsed mouth upon itself, inserting adhesive between the opposed inner edges of said mouth to seal said mouth in closed position, folding said folded mouth against the filled portion of said bag, and securing said mouth to said filled portion.

5. The method of closing a filled bag comprising tucking the side walls of the unfilled mouth portion of a bag inwardly between the front and rear walls of said mouth portion, collapsing said front and rear walls upon said inwardly tucked side walls, folding said collapsed mouth upon itself, inserting adhesive between the opposed inner edges of said mouth to seal said mouth in closed position, applying adhesive to a portion of said bag adjacent said folded mouth, and folding said folded mouth against the portion of said bag to which adhesive has been applied.

6. The method of closing a filled bag comprising tucking the side walls of the unfilled mouth portion of a bag inwardly between the front and rear walls of said mouth portion, collapsing said front and rear walls upon said inwardly tucked side walls, trimming said collapsed mouth to form parallel edges, folding said collapsed mouth upon itself, inserting adhesive between the opposed inner surfaces of said mouth adjacent said trimmed edges to seal said mouth in closed position, folding said folded mouth against the filled portion of said bag, and securing said mouth to said filled portion.

7. The method of closing a filled bag comprising tucking the side walls of the unfilled mouth portion of a bag inwardly between the front and rear walls of said mouth portion, collapsing said front and rear walls upon said inwardly tucked side walls, folding said collapsed mouth upon itself to bring the open edges of said mouth into proximity with the base of said mouth, inserting adhesive between the opposed inner edges of said mouth to seal the same in closed position, applying adhesive to a portion of said mouth adjacent the base thereof, applying adhesive to a portion of the top of the bag adjacent the base of said mouth, and folding the folded mouth upon the top of said bag, the adhesive applied to said open edges, to said mouth portion and the top of said bag uniting to secure said mouth in sealed, folded position.

8. In a machine for closing filled bags having the side walls of their unfilled mouth portions tucked inwardly and the front and rear walls collapsed upon said intucked side walls, the combination of means for inserting adhesive between the edges of the collapsed mouth of a bag, and means to press said mouth to cause the inner surfaces of said mouth adjacent said edges to adhere in sealed condition.

9. In a machine for closing filled bags having the side walls of their unfilled mouth portions tucked inwardly and the front and rear walls collapsed upon said intucked side walls, the combination of means for inserting adhesive between the edges of the collapsed mouth of a bag, and means to fold said mouth upon the filled portion of said bag, said last-named means exerting pressure to cause the inner surfaces of said mouth adjacent said edges to adhere in sealed condition.

10. In a machine for closing filled bags having the side walls of their unfilled mouth portions tucked inwardly and the front and rear walls collapsed upon said intucked side walls, the combination of means for inserting adhesive between said edges, means to apply adhesive to a surface of said bag adjacent said collapsed mouth, and means to fold said collapsed mouth into contact with said adhesive bearing surface, said last named means exerting pressure to cause the inner surfaces of said mouth adjacent said edges to adhere in sealed condition and to cause said mouth to adhere to said adhesive bearing surface.

11. In a machine for closing filled bags having the side walls of their unfilled mouth portions tucked inwardly between the front and rear walls, and having the front and rear walls collapsed upon said inwardly tucked side walls, the combination of means for holding the collapsed mouth of a bag transversely of itself, means for inserting adhesive between the opposed inner edges of said collapsed mouth, and means for folding said folded mouth into contact with the filled portion of said bag.

12. In a machine for closing filled bags having the side walls of their upwardly extending unfilled mouth portions tucked inwardly between the front and rear walls, and having the front and rear walls collapsed upon said inwardly tucked side walls, the combination of means for folding said collapsed mouth transversely of itself, means to insert adhesive between the open edges of said collapsed mouth, means to apply adhesive to a surface of said bag adjacent said collapsed mouth, and means to fold said folded mouth into contact with said adhesive-bearing surface, said last named means exerting pressure to cause the inner surfaces of said mouth adjacent said open edges to adhere in sealed condition and to cause said folded mouth to adhere to said adhesive-bearing surface.

13. In a machine for closing filled bags having the unfilled mouth portions thereof collapsed into substantially a single plane, the combination of an adhesive applicator; means to produce relative movement between a bag and said applicator; and means for guiding the top edges of the collapsed mouth of said bag into contact with said applicator during said relative movement whereby to cause an insertion of adhesive between the opposed inner edges of said collapsed mouth.

14. In a machine for closing filled bags having the unfilled mouth portions thereof collapsed into substantially a single plane, the combination of an adhesive applicator rotatable about a fixed axis; means to move a bag past said applicator for a distance at least equal to the width of such bag; and means operative during such movement for guiding the edges of said collapsed mouth into contact with said rotating applicator whereby to cause an insertion of adhesive between the opposed inner edges of said collapsed mouth.

15. In a machine for closing filled bags having the unfilled mouth portions thereof collapsed into substantially a single plane, the combination of means for trimming the edges of the collapsed mouth of a bag, an adhesive applicator, means to produce relative movement between said bag and said applicator, and means for guiding the trimmed edges of said collapsed bag mouth into contact with said applicator during said relative movement whereby to cause an insertion of adhesive between the opposed inner edges of said collapsed mouth.

16. In a machine for closing filled bags having the unfilled mouth portions thereof collapsed into substantially a single plane, the combination of an adhesive applicator rotatable about a fixed vertical axis, means to rotate said adhesive applicator about said axis, means to present a bag to said applicator for movement relative thereto at least equal to the width of said bag, and means operative during such relative movement for guiding the edges of said collapsed mouth into contact with said applicator whereby to cause the insertion of adhesive between the opposed inner edges of said collapsed mouth.

17. In a machine for closing filled bags having the unfilled mouth portions thereof collapsed into substantially a single plane, the combination of an adhesive applicator having angularly intersecting adhesive bearing surfaces, means to cause relative movement between the bag and said a plicator for a distance at least equal to the width of such bag, and means operative during such movement for guiding the edges of said collapsed mouth into contact with said applicator at a point adjacent the intersection of said adhesive bearing surfaces whereby to cause an insertion of adhesive between the opposed inner edges of said collapsed mouth.

18. In a machine for closing a series of filled bags each having an unfilled mouth portion collapsed to bring opposed walls thereof into proximity, the combination of an adhesive applicator, means to produce relative movement between each of said bags and said applicator, means for trimming the collapsed mouths of the several bags to assure uniform presentation thereof to said adhesive applicator, and means for guiding the edges of said trimmed collapsed mouths into contact with said applicator during said relative movement whereby to cause an insertion of adhesive between the opposed inner edges of each of said collapsed mouths.

19. The method of sealing an open mouthed bag formed of paper treated with a moisture proofing substance which comprises folding together the sides of the mouth portion to form an upstanding closure and then passing said mouth portion through a supply of a melted wax-like substance to transfer said wax-like substance onto the exterior surfaces including the top edges of said closure whereby to form a continuous cap of the wax-like substances to provide a substantially air tight and moisture-proof seal for said closure upon cooling and hardening thereof.

20. The method of sealing an open mouth bag formed of paper which comprises folding together the sides of the mouth portion to form an upstanding closure and then passing said mouth portion through a supply of settable material capable of bonding with the paper of said bag to transfer said material onto at least the top edges of said closure whereby to form a continuous cap of said material to provide a substantially tight seal across the full width of said closure upon setting of said material.

21. The method of sealing an open mouth bag formed of paper which comprises folding together the sides of the mouth portion to form an upstanding closure and then subjecting said mouth portion to contact with a quantity of settable material to transfer said material onto the exposed surfaces including the top edges of said closure whereby to form a continuous cap of said material to provide a substantially tight seal across the full width of said closure upon setting of said material.

22. In a method of sealing an open mouth bag formed of paper and having the sides of the mouth portion thereof folded together to form an upstanding closure, the step of transferring settable material capable of bonding with the paper of said bag onto at least the top edges of said closure whereby to form a continuous cap of said material to provide a substantially tight seal across the full width of said closure upon setting of said material.

23. The method of closing a filled bag comprising tucking the side walls of the unfilled mouth portion of a bag inwardly between the front and rear walls of said mouth portion, collapsing said front and rear walls upon said inwardly tucked side walls, and then passing said mouth portion through a supply of settable material capable of bonding with the material of said bag to transfer said settable material onto at least the top edges of said mouth portion whereby to form a continuous cap of said settable material to provide a substantially tight seal across the full width of said mouth portion upon setting of said material.

24. The method of closing a filled bag comprising tucking the side walls of the unfilled mouth portion of a bag inwardly between the front and rear walls of said mouth portion, collapsing said front and rear walls upon said inwardly tucked side walls, folding said collapsed mouth upon itself, and then passing said mouth portion through a supply of settable material capable of bonding with the material of said bag to transfer said settable material onto at least the top edges of said mouth portion whereby to form a continuous cap of said settable material to provide a substantially tight seal across the full width of said mouth portion upon setting of said material.

25. The method of closing a filled bag comprising tucking the side walls of the unfilled mouth portion of a bag inwardly between the front and rear walls of said mouth portion, collapsing said front and rear walls upon said inwardly tucked side walls, trimming said collapsed mouth to form parallel edges, folding said collapsed mouth upon itself, and then passing said mouth portion through a supply of settable material capable of bonding with the material of said bag to transfer said settable material onto at least the top edges of said mouth portion whereby to form a continuous cap of said settable material to provide a substantially tight seal across the full width of said mouth portion upon setting of said material.

26. The method of closing a filled bag comprising tucking the side walls of the unfilled mouth portion of a bag inwardly between the front and rear walls of said mouth portion, collapsing said front and rear walls upon said inwardly tucked side walls, and then passing said mouth portion through a supply of settable material capable of bonding with the material of said bag to insert said settable material between the opposed inner surfaces of said mouth adjacent the edges thereof and to transfer said settable material onto the top edges of said mouth whereby to form a continuous cap of said settable material and to provide a substantially tight seal across the full width of said mouth portion upon setting of said material.

27. A machine for closing filled bags having the side walls of their unfilled mouth portions tucked inwardly and the front and rear walls collapsed upon said intucked side walls comprising means for applying adhesive to at least the top edges of the collapsed mouth of a bag whereby to form a continuous cap of said adhesive, and means to press said mouth to cause said adhesive to seal mouth in closed position.

28. A machine for closing filled bags having the side walls of their unfilled mouth portions tucked inwardly and the front and rear walls collapsed upon said intucked side walls comprising means for passing the collapsed mouth portions of a bag through a supply of settable material capable of bonding with the material of said bag whereby to transfer said settable material onto at least the top edges of said collapsed mouth portion, and means to press said mouth to form a continuous cap of said settable material and a tight seal across the full width of said collapsed mouth portion.

HOWARD G. ALLEN.